UNITED STATES PATENT OFFICE.

WALLACE A. BEATTY, OF NEW YORK, N. Y., ASSIGNOR, BY DIRECT AND MESNE ASSIGNMENTS, TO GEORGE W. BEADLE, OF NEW YORK, N. Y.

CONDENSATION PRODUCT AND PROCESS OF MAKING SAME.

1,225,748. Specification of Letters Patent. Patented May 15, 1917.

No Drawing. Application filed June 6, 1912. Serial No. 702,046.

*To all whom it may concern:*

Be it known that I, WALLACE A. BEATTY, a citizen of the United States, residing at New York, in the county of New York and State of New York, have invented certain new and useful Improvements in Condensation Products and Processes of Making Same, of which the following is a specification.

This invention relates to a new substance or compound and to a method of producing the same, and has for one of its objects the production of said compound in an efficient and comparatively inexpensive and expeditious manner.

With this and other objects in view the invention consists in the novel substance or compound constituting my new article of manufacture, and in the novel steps and combinations of steps constituting my method, or process, all as will be more fully hereinafter disclosed and particularly pointed out in the claims.

More particularly stated the purpose of the invention is to produce an artificial and inodorous gum to be used in the various arts, especially for coating, lacquering, and in solid forms for the production of articles of manufacture.

Stated generally the compound, or gum is made by mixing acetone, or its homologues, with phenol or certain of its homologues, to produce a condensation product, which product is later treated with formaldehyde, or one of its polymers, to produce a second condensation product which latter, in turn, constitutes my new gum, as will presently appear. In other words the process is carried out in two steps, first consisting, for example, of the condensation of acetone with phenol to produce the condensation product known as dioxy-diphenyl-dimethyl-methane which product is later treated with formaldehyde to produce the second condensation product constituting my new gum.

A specific example of the carrying out of this process may be given as follows: I may mix together eight hundred and forty (840) parts by weight of phenol, one hundred and seventy five (175) parts by weight of acetone, and eighty four (84) parts by weight of hydrochloric acid (HCl) having a specific gravity of 1.20. This mixture is allowed to stand at from 30° C. to 40° C. until the entire mass becomes solid to form the first mentioned condensation product which has a crystalline structure. I am not limited, of course, to hydrochloric acid in producing this first condensation product, for sulfuric acid ($H_2SO_4$) may be used, or other acids having the same condensing properties.

The crystals thus produced are next washed with dilute acetic acid, and if necessary are recrystallized from hot water, or dilute acetic acid and dried. The purpose of this purification is to get rid of the remaining carbolic acid and any other impurities that may be present. The dioxy-diphenyl-dimethyl-methane thus produced will be found to consist of a colorless mass of crystals melting at 150° C. to 154° C. free from odor, and soluble in all ordinary organic solvents such as alcohol, acetic acid, ethyl acetate, etc., but practically insoluble in water. The reaction producing this first named product may be written as follows:

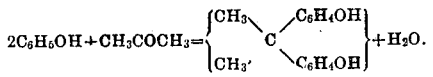

Having produced and purified the first condensation product I proceed to form the second condensation product or gum as follows: The above crystals are dissolved in a hot solution, of 40% formaldehyde, in such quantities as will preferably contain exceeding sixty parts of formaldehyde to two hundred and twenty-eight parts dioxy-diphenyl-dimethyl-methane. These proportions may, of course, be varied.

To this mixture of crystals and formaldehyde is added a few parts by weight of a substance having an acid or an alkaline reaction to effect the condensation of the formaldehyde with the crystals in order to produce the second condensation product or gum. The substance thus added may be in the form of an acid, but is preferably in the form of an alkali, or an alkaline earth hydrate, or a salt having an alkaline or acid reaction. Sodium hydroxid, ammonia, or an amin are generally used. The quantity of the alkali or acid used will of course vary with the nature of the substance added, and may be readily determined by experiment in each case.

A specific example of the production of the gum from the above crystals and formaldehyde may be given as follows: To the above designated quantity of 40% formaldehyde and to each one hundred grams of crystals may be added one gram of sodium hydroxid (NaOH) which will be sufficient to produce the desired result although more may be used. The temperature is now raised to 100 degrees centigrade and the reaction proceeds to completion. Usually the heat of the reaction is sufficient to maintain it, so the external heat is removed. After a time, when the reaction has moderated, external heat is applied to raise the temperature again to 100° C. and the heating continued until the desired viscosity is attained. This requires about one hour. It is preferable to heat the mixture in a closed vessel. The liquid on standing separates into two layers, the upper of which consists of the excess of aldehyde and alkali dissolved in water and the lower of which is the gum. This gum is next drawn off, washed with water and dried in a vacuum at 50 degrees centigrade.

The reaction occurring between the dioxy-diphenyl-dimethyl-methane and the formaldehyde during the first heating probably is as follows:—

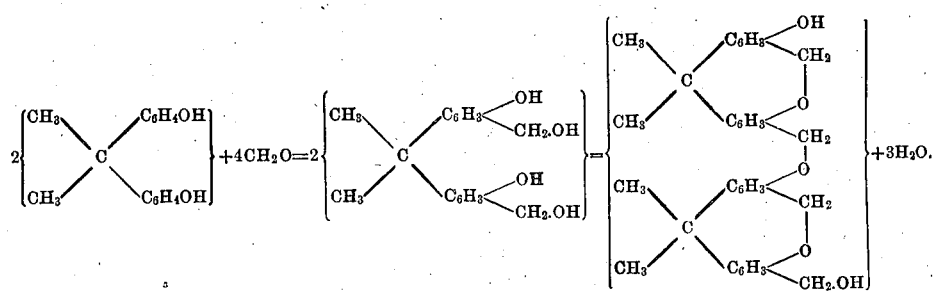

Upon further heating, further reactions take place, in which more water is liberated. The gum is inodorous and varies from a practically colorless and transparent to a dark brown mass, depending on the duration of the heating, the amount of the alkali, the kind of alkali used, and on the purity of the dioxy-diphenyl-dimethyl-methane crystals. The gum is soluble in strong alkali, and very brittle; but if acids are added to a solution of the gum in alkali a gum is precipitated which is insoluble in alkali. The gum is soluble in alcohol, acetone, glacial acetic acid, amyl alcohol, amyl acetate, and acetylene-tetrachlorid, or mixtures of these. It is insoluble in oils, as linseed oil, turpentine, and mineral oils.

On heating the gum thus produced below 100 degrees centigrade for a longer time, depending on the thickness of the layer, or a shorter time at 150 degrees centigrade, the gum passes gradually through different stages of less and less solubility toward the reagents which originally affected it until it becomes insoluble in its former solvents and only slightly affected by strong alkalis and acids. It is now an inodorous, transparent mass, very strong, non brittle and tenacious, instead of brittle as formerly, very hard, and will not burn unless kept continually in a flame. In this condition no solvent has been found for it.

As stated above, ammonia, formaldehyde, and the crystals may be used to produce the gum, but it has been found possible to produce the gum with a condensation product of formaldehyde and ammonia only; namely, hexamethylenetetraamin. The advantage of using this last named method consists in obtaining a dry product in one step. It has been found that hexamethylenetetraamin in the presence of dioxy-diphenyl-dimethyl-methane breaks down when they are heated together, giving the same result as when the latter substance is heated with ammonia and formaldehyde, ammonia being evolved. The reaction with a formaldehyde solution and ammonia is undoubtedly the same as with the hexamethylenetetraamin. In both cases we have the ammonia evolved and taking no part in the reaction except as a catalytic or condensing agent.

The method of carrying out the reaction of this last named process is as follows: Six hundred and eighty-four parts of dioxy-diphenyl-dimethyl-methane crystals are melted at the lowest possible temperature (about 150 degrees centigrade) and to these are added, in a fine powder, one hundred and forty parts of hexamethylenetetraamin. The reaction begins immediately, ammonia being evolved. Care should be taken however, that the product is heated just sufficiently to produce the evolution of ammonia, because as soon as the gum begins to be formed owing to the heat evolved it is not necessary to maintain it at the temperature of 150 degrees centigrade used in the beginning.

The reaction with hexamethylenetetramin $(CH_2)_6N_4$ may be represented as follows:

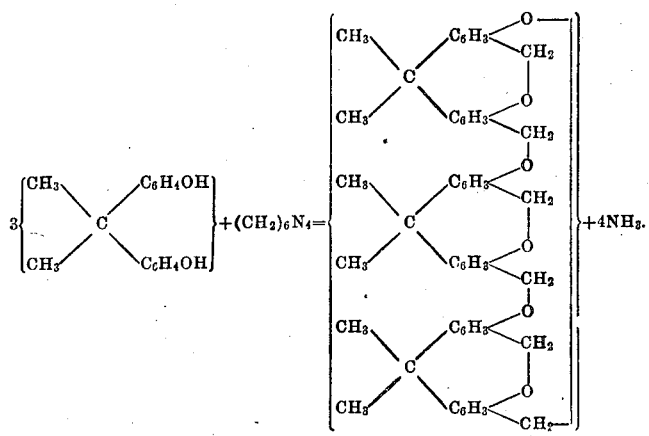

We have now a gum similar to the first form of gum described above, and which passes on further heating into an insoluble mass similar to the second form also described above.

Of course, aldehydes other than those mentioned above may be employed and still produce substantially the same gum.

It will thus be seen that an important feature of my invention resides in the fact that by employing the comparatively inexpensive materials consisting of acetone and phenol I am enabled to produce a raw base material (the above named dioxy-diphenyl-dimethyl-methane,) in a crystalline form, which is capable of being inexpensively washed and purified thus freeing it from carbolic acid so that the subsequent reaction between these crystals and formaldehyde produces at a very low cost a gum of great purity, very light in color or transparent, and capable of a wide range of uses.

It is obvious that those skilled in the art may vary the above procedure without departing from the spirit of my invention and therefore I do not wish to be limited by this disclosure except as may be required by the claims.

What I claim is:

1. A condensation product of a substance having the formula

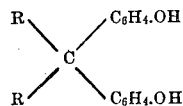

in which R represents an alkyl radical; and a substance having at least one methylene group, said product being of a gummy nature, and soluble in strong alkali, substantially as described.

2. An odorless gum soluble in alkalis, which gum, when acted upon by an acid, is converted into a substance which is insoluble in alkalis.

3. An odorless condensation product in the form of a brittle gum, which is soluble in alkalis, acetone, alcohol, amyl alcohol, amyl acetate, glacial acetic acid, acetylene tetrachlorid, and insoluble in linseed oil, turpentine or mineral oils, said gum, when acted upon by an acid, being converted into a substance which is insoluble in alkalis, and said gum being convertible by heat into a substance insoluble in the above mentioned solvents.

4. A substance having a formula of approximately:—

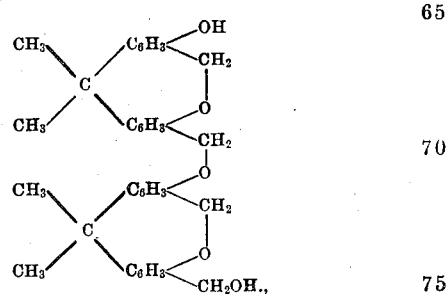

substantially as set forth.

5. A substance having a formula of approximately:—

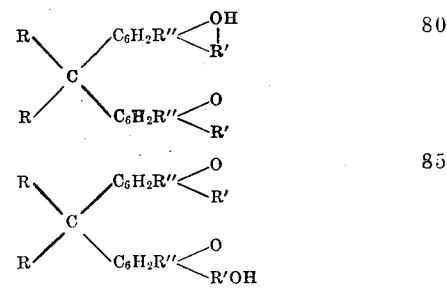

in which R represents an alkyl radical, R' an alkylidene radical, and R" a hydrogen or an alkyl radical.

6. A process of making a condensation product, which comprises reacting upon a body having the formula

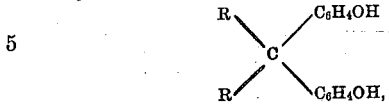

(in which R represents an alkyl radical) with a substance having at least one methylene group.

7. A process of making a condensation product, which comprises reacting upon a body having the formula

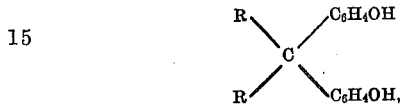

(in which R represents an alkyl radical) with a substance having at least one methylene group in the presence of an alkali.

8. A process of making a condensation product, which comprises reacting upon a body having the formula

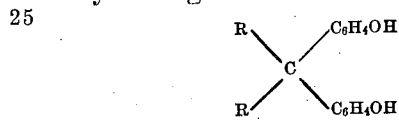

(in which R represents an alkyl radical) with a substance having at least one methylene group in the presence of a condensing agent.

9. A process of making a condensation product, which comprises reacting upon a body having the formula

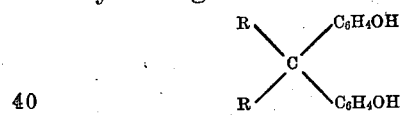

(in which R represents an alkyl radical) with a substance having at least one methylene group at an elevated temperature.

10. A process of making a condensation product, which comprises reacting upon a body having the formula

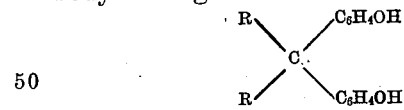

(in which R represents an alkyl radical) with formaldehyde.

11. A process of making a condensation product, which comprises reacting upon a body having the formula

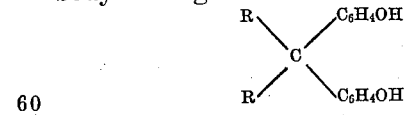

(in which R represents an alkyl radical) with formaldehyde in the presence of an alkali.

12. A process of making a condensation product, which comprises reacting upon a body having the formula

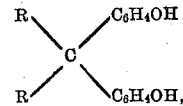

(in which R represents an alkyl radical) with formaldehyde in the presence of a condensing agent.

13. A process of making a condensation product, which comprises reacting upon a body having the formula

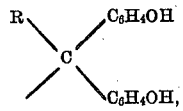

(in which R represents an alkyl radical) with formaldehyde at an elevated temperature.

14. A process of making a condensation product, which comprises reacting upon a body having the formula

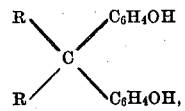

(in which R represents an alkyl radical) with formaldehyde in the presence of a condensing agent at a temperature of about 90 to 150° C.

15. A process of making a condensation product, which comprises reacting upon a body having the formula

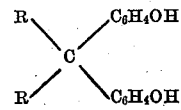

(in which R represents an alkyl radical) with formaldehyde in the presence of a condensing agent at a temperature of about 90 to 150° C.

16. A process of making a condensation product, which comprises reacting upon a body having the formula

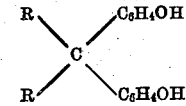

(in which R represents an alkyl radical) with formaldehyde in the presence of ammonia at a temperature of about 90 to 150° C.

17. A process of making a condensation product, which comprises reacting upon dioxy-diphenyl-dimethyl-methane with a substance containing at least one methylene group.

18. A process of making a condensation product, which comprises reacting upon dioxy-diphenyl-dimethyl-methane with a substance containing at least one methylene group in the presence of an alkali.

19. A process of making a condensation product, which comprises reacting upon dioxy-diphenyl-dimethyl-methane with a substance containing at least one methylene group in the presence of a condensing agent.

20. A process of making a condensation product, which comprises reacting upon dioxy-diphenyl-dimethyl-methane with a substance containing at least one methylene group at an elevated temperature.

21. A process of making a condensation product, which comprises reacting upon dioxy-diphenyl-dimethyl-methane with a substance containing at least one methylene group and with ammonia.

22. A process of making a condensation product, which comprises reacting upon dioxy-diphenyl-dimethyl-methane with a substance containing at least one methylene group in the presence of ammonia at a temperature of about 90 to 150° C.

23. A process of making a condensation product, which comprises reacting upon dioxy-diphenyl-dimethyl-methane with formaldehyde in the presence of a condensing agent.

24. A process of making a condensation product, which comprises reacting upon dioxy-diphenyl-dimethyl-methane with formaldehyde in the presence of an alkali.

25. A process of making a condensation product, which comprises reacting upon dioxy-diphenyl-dimethyl-methane with formaldehyde in the presence of a condensing agent at an elevated temperature.

26. A process of making a condensation product, which comprises reacting upon dioxy-diphenyl-dimethyl-methane with formaldehyde in the presence of ammonia at a temperature of about 90 to 150° C.

27. A process of making a condensation product, which comprises reacting upon dioxy-diphenyl-dimethyl-methane with an aldehyde.

28. A process of making a condensation product, which comprises reacting upon dioxy-diphenyl-dimethyl-methane with an aldehyde in the presence of an alkali.

29. A process of making a condensation product, which comprises reacting upon dioxy-diphenyl-dimethyl-methane with an aldehyde in the presence of an alkali at a temperature of about 100 to 150° C.

30. A compound produced by the reaction of methane derivatives having the formula

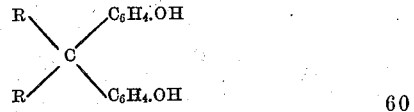

(where R may be members of the homologous series $C_nH_{2n}+$) with formaldehyde, or its polymers, by means of condensing agents, and said compound having the physical characteristics of a gum insoluble in turpentine and benzine, but soluble in alcohol and alkali.

31. A gum derived from the condensation of a ketone, a phenol, and an aldehyde, said gum being soluble in alcohol and alkali, inodorless, tasteless, and convertible into an insoluble mass.

In testimony whereof I affix my signature in presence of two witnesses.

WALLACE A. BEATTY.

Witnesses:
H. H. BYRNE,
CHAS. E. BRECKONS.